Oct. 18, 1966 H. S. PACK ETAL 3,280,308

UNIVERSAL TAPE READER WITH SENSING SUPPRESSION

Filed March 20, 1962 2 Sheets-Sheet 1

INVENTORS
HOWARD S. PACK
ALFRED Z. PURZYCKI

BY E. A. Kane

ATTORNEY

INVENTORS
HOWARD S. PACK
ALFRED Z. PURZYCKI

BY E. F. Kane

ATTORNEY

United States Patent Office 3,280,308
Patented Oct. 18, 1966

3,280,308

UNIVERSAL TAPE READER WITH SENSING SUPPRESSION

Howard S. Pack, Chicago, and Alfred Z. Purzycki, Mount Prospect, Ill., assignors to Teletype Corporation, Skokie, Ill., a corporation of Delaware Filed Mar. 20, 1962, Ser. No. 181,029
6 Claims. (Cl. 235—61.11)

This invention relates to tape readers for printing telegraph systems and more particularly to a tape reader for use in high speed transmission of telegraph codes which differ in the number of levels in the various codes.

In view of the fact that the transmission of business machine controlling data together with normal telegraph transmission has come into extensive use, the need has arisen for tape readers that will read codes such as those used almost universally in regular telegraph transmission as well as the codes (machine language) used in business machines. The binary code in almost universal use for telegraph transmission is the five level, "start-stop" Baudot code whereas various business machines use 6, 7 and 8 level binary codes and some telegraphic systems use a six level code known as the "sixth level shift" code. A universal tape reader, capable of handling these various codes interchangeably, must be provided with suitable tape guiding means and tape sensing means.

Accordingly, it is an object of the present invention to provide a tape reader of simple construction which is capable of handling various widths of tape and which may be set to read various codes each having a different number of levels in them.

Another object of the invention is to provide a tape reader capable of handling tapes of three different widths and containing from five to eight perforations in each transverse row read by the reader.

A still further object of the invention is the provision of a universal tape reader which will suppress the sensing of unused levels in the code of the tape being read.

In accordance with one embodiment of the invention a tape reader having sensing pins for detecting the presence or absence of code perforations in a tape, is provided with individually movable tape guides to define tape feed channels of different widths for handling tapes having different numbers of perforations or levels on each side of the feed hole perforations in the tape. The apparatus comprising the preferred embodiment of the invention is also provided with mechanism for selectively blocking the operation of those sensing pins which are not being used in the reading of the tapes which have less than the maximum number of significant control areas or levels. Preferably, the mechanism for blocking the operation of the unused sensing pins comprises a plurality of cam actuated blocking levers which may be selectively set to prevent the spring means which normally drive the sensing fingers to a sensing position from driving these members.

A complete understanding of the invention may be had from the following detailed description, when considered in conjunction with the accompanying drawing wherein.

Figures 1, 2, 5:
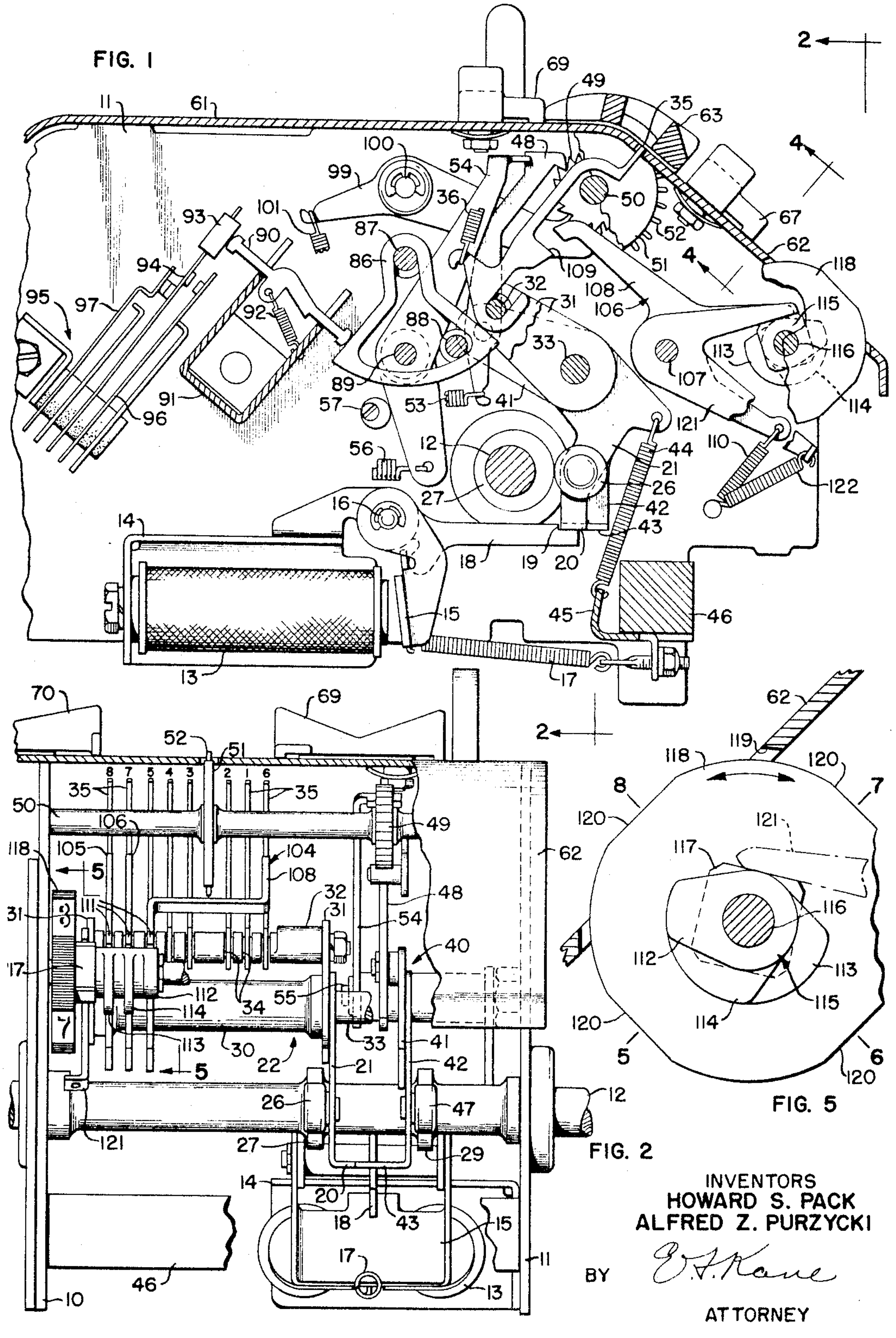
FIG. 1 is a transverse sectional view taken through a tape reader constructed in accordance with the present invention.
FIG. 2 is a sectional view taken along the line 2—2 of FIG. 1 in the direction of the arrows, parts being broken away, more clearly to illustrate those parts behind them.
Figure 4:
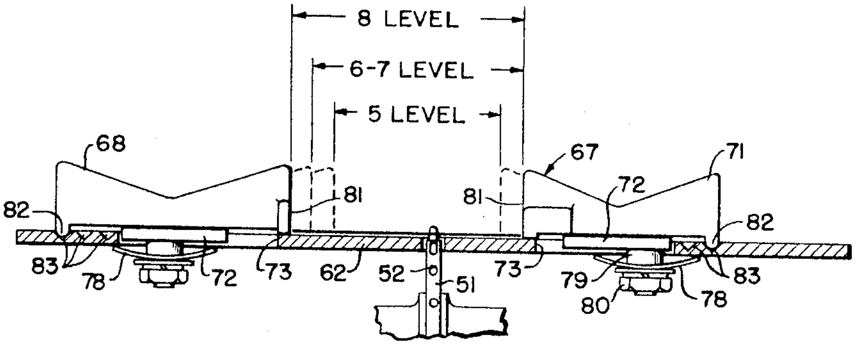

FIG. 4 is a fragmentary sectional view taken along the line 4—4 of FIG. 1, in the direction of the arrows, showing details of construction of the tape guiding mechanism, and FIG. 5 is a fragmentary sectional view taken substantially along the line 5—5 of FIG. 2 in the direction of the arrows and illustrating the cams which may be manipulated to block selected ones of the sensing pins from engaging a tape.

Referring now to the drawings wherein like reference characters designate the same parts throughout the various views and first having reference to FIG. 2, it will ?be seen that the apparatus is supported between a pair of main side plates 10 and 11 in which there is suitably journaled a main drive shaft or motor shaft 12. This main motor shaft 12 is driven by a motor (not shown) and supplies the operating power for operating the various moving parts in the reader. The shaft 12 is constantly driven and is rendered effective to actuate the various operating parts upon energization of a control magnet 13 which is mounted on a suitable bracket 14 secured to the side plate 11. The bracket 14 pivotally supports an armature 15 of the control magnet 13 and the armature is normally urged to rock in a counterclockwise direction (FIG. 1) about a pivot shaft 16 by a contractile spring 17. Also pivoted on the pivot shaft 16 is a blocking lever 18 which is actuated by the armature 15. The blocking lever 18 has a shoulder 19 formed on it which, when the magnet 13 is not energized, rests against a transversely extending portion 20 of a lever 21 forming part of a bail assembly 22.

Figure 3:
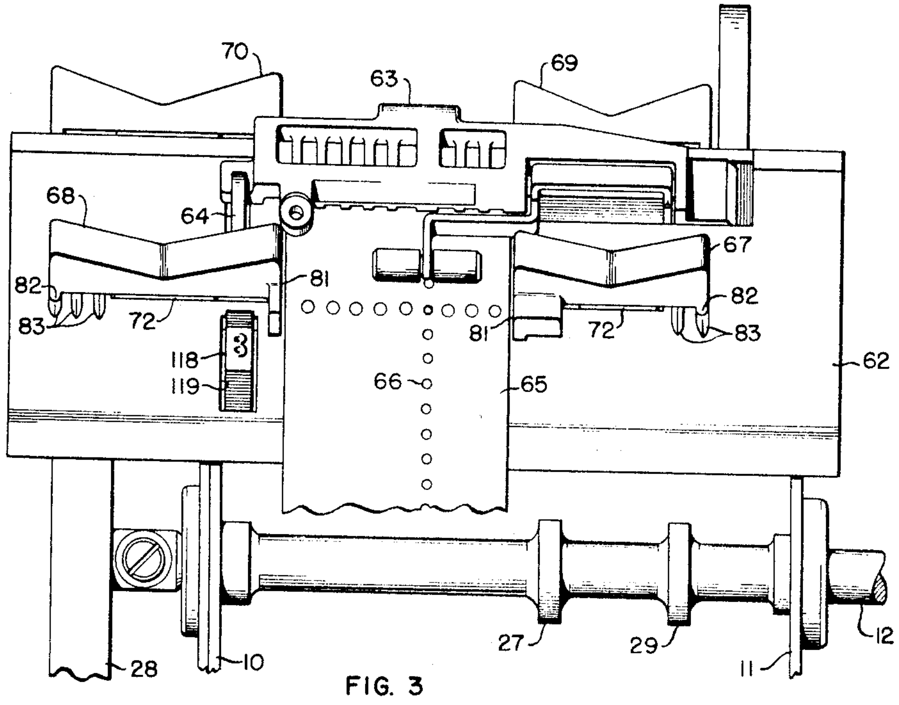
FIG. 3 is a fragmentary end elevational view of the apparatus shown in FIG. 1 showing the tape guiding mechanism.

The lever 21 has a cam roller 26 mounted on it for cooperation with a cam 27 on the main drive shaft 12. This drive shaft 12, as shown in FIG. 3, extends beyond the side plate 10 and carries a timing fly wheel 28, the operation of which is not pertinent to the present invention and the shaft 12 also carries a feed pawl actuating cam 29.

The bail assembly 22 comprises a drum portion 30 to which there is affixed a pair of levers 31 that are mounted at the end of the drum portion to support a cross member 32 of the assembly. The drum portion 30 is oscillatably mounted on a pivot shaft 33 which extends between the side plates 10 and 11. When the cam 27, through the cam roller 26, actuates the lever 21, the cross member 32 will be oscillated in an arcuate path about the axis of the pivot shaft 33. Cross member 32 is provided with a plurality of annular slots 34 which constitute guide means for slidably supporting a plurality of sensing pins 35.

As may be seen more clearly in FIG. 1 the lower ends of the sensing pins 35 are of U-shaped configuration so that they engage the reduced portions of the cross member 32 and have their lower ends guided by the slots 34. Each of the sensing pins 35 is individually urged upwardly by a contractile spring 36 individual to it and is driven downwardly, to the position shown in the drawing, by the reduced portion of the cross member 32 when the bail assembly 22 has been rocked to its counterclockwise position as shown in the drawings.

The pivot shaft 33 pivotally supports a pawl actuating leverage mechanism 40 (FIG. 2) comprised of a pair of levers 41 and 42. The lever 42 has transversely extending end portion 43 which lies in the path of the movement of the transversely extending portion 20 of the lever 21 and consequently, when the electromagnet 13 is deenergized to block oscillation of the lever 21, the lever 21 will prevent the lever 42 from moving counterclockwise about the shaft 33. The levers 21 and 42 are urged to rock in a clockwise direction (FIG. 1), about the shaft 33, by contractile springs 44 individual to them which extend between the levers 21 and 42 and a bracket 45 to which the spring 17 is also attached. The bracket 45 is suitably secured to a cross brace 46 which extends between the side plates 10 and 11.

Suitably mounted on the lever 42 is a cam roller 47 which rides the cam 29 unless the lever 42 is blocked from following the contour of the cam 27 by the blocking lever 18 and the portion 20 of the lever 21. In the normal operation of the apparatus the sensing pins 35 will be cyclically moved upwardly and to the right as viewed in FIG. 1 by their contractile springs 36 due to the fact that the bail assembly 22 will follow the contour of cam 27 provided the electromagnet 13 is energized to remove the blocking member 18 from blocking the operation of the lever 21. Similarly, each cycle of rotation of the shaft 12 will, through the cam 29 and cam roller 47, impart oscillation to the leverage mechanism 40.

The lever 41 has a feed pawl 48 pivoted on it for cooperation with a feed ratchet 49 that is fixed to a feed wheel shaft 50. The feed wheel shaft carries a feed wheel 51 having radially extending feed fingers 52 which will register with feed holes in the tape to advance the tape through the reader. The feed pawl 48 is biased to rock in a clockwise direction (FIG. 1) about its pivotal connection with the lever 41 by a contractile spring 53. The upper end of the feed pawl 48 is guided and damped by a damping lever 54 which has a slot in its upper end into which the upper portion of the feed pawl 48 extends. The damping lever 54 is biased to rock about a pivot shaft 55 (FIG. 2) by a spring 56 and is blocked from rocking beyond a predetermined point by an adjustable eccentric stop 57. The shaft 55 is suitably mounted on the side plate 11.

Mounted on the upper edges of the side plates 10 and 11 is a cover plate 61 which cooperates with a tape lid plate 62 to enclose the upper portions of the apparatus. The tape lid plate 62 is provided with suitable aperture into which the upper ends of the sensing pins 35 extend and through which the upper ends of these sensing pins may be projected when the bail assembly 22 is released for actuation by its cam 26. Cooperating with the tape lid plate 62 is pivoted tape lid 63 which is normally latched in the position shown in the drawing, by a latch member 64, to guide a strip of tape 65 across the tape sensing pins 35 one step each time the feed pawl 48 is actuated. The tape lid 63 holds the tape down so that if any one of the sensing pins 35 fails to find an aperture in the tape in alignment with it, the pin will not be permitted to move upwardly when the bail assembly 22 is rocked clockwise as viewed in FIG. 1.

In the embodiment of the invention shown herein, eight sensing pins 35 are provided for sensing any one of eight levels of a tape 65 that is fed into association with them by the feed wheel 51. As will be apparent by reference to FIG. 4 the tape lid plate 62 is provided with a slot through which the feed fingers 52 on the feed wheel 51 are permitted to pass to engage feed holes 66. The tape lid 63 serves to hold the tape against the tape lid plate 62 in an area between two sets of tape guides comprising guide members 67, 68, 69 and 70. These tape guide members 67, 68, 69 and 70 are all of substantially the same construction and cooperate to define a tape channel. The tape guide members 67 and 69 are positioned at the right side of the channel through which the tape is to be fed and each of the guide members 67 to 70 comprises a block 71 having a downwardly extending rectangular projection 72 which extends into a rectangular slot 73 formed in the tape lid plate 62. These guide members 67 to 70 are each resiliently held in engagement with the upper surface of the tape lid plate 62 by spring washers 78 which encircle threaded studs 79 formed integrally with the rectangular projection 72 and extending downwardly from the projection 72. The spring washers 78 are compressed against the under surface of the tape lid plate 62 by hexagonal nuts 80 threaded onto the studs 79.

Each of the blocks 71 has a tape guiding surface 81 formed on it and has a rounded projection 82 formed on it adjacent the end opposite to the tape guiding surface for registering in one of a plurality of rounded notches 83 formed in the upper surface of the tape lid plate 62. There are two notches 83 provided for locating the tape guide members 67 and 69 and three notches 83 for locating the tape guide members 68 and 70. Thus, the two tape guide members at the right-hand side of the tape channel as shown in FIG. 3 may be set to either one of two selective positions by manually moving them whereas the tape guide members 68 and 70 at the left side of the tape channel may be set to any one of three different positions depending upon the width of tape being fed through the apparatus. The spring washers 78 will hold the tape guide members 67 to 70 in their selected positions but the tape guide members may be shifted to other positions by pushing them toward or away from the tape channel.

Each of the sensing pins 35 has aligned with it a bell-shaped lever 86 (FIG. 1) and these levers 86 are oscillatable about a pivot shaft 87 and are guided by slotted guide posts 88 and 89 which extend inwardly from the side plate 10 and have annular slots in them in which the bell-shaped levers 86 are freely slidable. The bell-shaped levers 86 are each individually urged into engagement with the lower edge of each of their respective sensing pins 35 by a plunger 90 individual to each lever 86. The plungers 90 are slidably mounted in a bracket 91 and are urged downwardly to the right (FIG. 1) by contractile springs 92. The upper ends of the plungers 90 engage insulators 93 of contact swingers 94 individual to them and each swingers 92 forms the center contact spring of a contact spring pile-up 95 comprising the swinger 94 and contact springs 96 and 97.

As shown in the drawings the apparatus is at rest and consequently each plunger 90 is forced upwardly to the left against the action of its spring 92 by the bell-shaped lever 86 which is in turn held in its clockwise position (FIG. 1) by the lower edge of the sensing pin 35 and the sensing pin 35 is held in that position by the cross member 32. When, in the cycle of operation of the apparatus, the low portion of the cam 27 is presented to the cam roller 26, the electromagnet 13 being energized, the spring 44 will rock the bail assembly 22 in a clockwise direction (FIG. 1). When the bail assembly 22 rocks in a clockwise direction all of the sensing pins 35 will be released and will be permitted to move upwardly under the influence of their springs 36 provided they find holes in the tape in all of the levels. If an imperforate level is detected by any one of the sensing pins 35 in moving upwardly it will be permitted to move only a very slight distance and its plunger 90 will be held by the bell-shaped lever 86 in position to maintain contact between the contact spring 97 and swinger 94 associated with that sensing pin that is not permitted to move upwardly, being blocked by the tape. The feed pawl 48 will also move upwardly under the influence of its spring and will be moved to engagement with another tooth on the ratchet 49, a detent pawl 99 being provided for preventing reverse movement of the ratchet 49 when the pawl 48 moves upwardly. This detent pawl 99 is pivoted on a pivot shaft 100 and is urged to rock in a counterclockwise direction (FIG. 1) to engage the teeth of the ratchet 49 by a contractile spring 101.

From the foregoing it is believed to be apparent that, if the electromagnet 13 is held energized to hold the blocking lever 18 out of blocking relation with the lever 21, the sensing pins will be released by the bail assembly 22 and the pawl 48 will be moved upwardly once in each cycle of rotation of the shaft 12 and then the pawl 48 and sensing pins 35 will be retracted to the position shown in FIG. 1. In any given cycle, those sensing pins 35 that are permitted to move upwardly through perforations in the tape will permit the bell-shaped levers 86 associated with them to rock counterclockwise about the pivot shaft 87 thereby permitting the plunger 90 associated with the sensing pins, that have found perforations in the tape, to be moved by their respective springs 92, thus, to open the circuit between their associated contact springs 97 and swingers 94 and to close a circuit between the swinger 94 and contact spring 96 where a perforation is found in the tape.

By reference to FIG. 2 it will be noted that there are three sensing pins 35 to the right of the feed wheel 51 and five sensing pins 35 to the left of the feed wheel 51, making a total of eight pins designated 1, 2, 3, 4, 5, 6, 7 and 8. When an eight level tape is fed through the apparatus the tape guide members 67, 68, 69 and 70 will be moved to their extreme outward positions, as shown in full lines in FIG. 4, to guide this tape through the apparatus and all eight sensing pins 35–1 to 35–8 will be permitted to move upwardly to detect the presence or absence of perforations in the tape in all eight levels of it. If a five, six or seven level code is being read by the apparatus the tape guide members 67 through 70 will have to be positioned differently than shown to handle this tape. For example, if a five level tape is being fed through the apparatus the tape guide members 67 and 69 are moved toward the tape feed wheel 51 and the rounded projections 82 are nested in the rounded notches 83 associated with the guide members 67 and 69 that are closest to the feed wheel 51. Similarly, the tape guides 68 and 70 must be moved to their innermost position and consequently, the rounded projection 82 on these guide members would be shifted to the extreme right-hand notch 83 associated with those guide members. Since six level and seven level tapes are of the same width, according to tape standards which have been adopted, the rounded projection 82 on the guide members 68 and 70 are nested in the middle one of the notches 83 associated with them and the rounded projection 82 on the tape guide members 67 and 69 are moved into the position shown in FIG. 4 when six and seven level tapes are being read.

In order to prevent the tape being fed through the apparatus from being damaged by having its edges "nibbled away," when the narrower widths of tape are being fed through the apparatus, mechanism is provided for selectively blocking the sensing pins 35–6, 35–7 and 35–8. In order to block these sensing pins 35 when narrower tapes are being fed through the apparatus, a series of blocking levers 104, 105 and 106 are provided which may be selectively positioned to block the sensing pins 35–6, 35–7 and 35–8 (FIG. 2). The blocking levers 104, 105 and 106 are pivoted for oscillation about a stud shaft 107 that extends inwardly from the side plate 10. The blocking levers 104, 105 and 106 have arms, such as the arm 108 of lever 104, which extend upwardly and to the left as viewed in FIG. 1 into position in alignment with shoulders 109 on the sensing pins 35–6, 35–8 and 35–7, respectively. The lever 104 has a transversely extending portion to reach across the sensing pins 35–1 to 35–5 so that the upwardly extending portion 108 of it is aligned with the shoulder 109 on sensing pin 35–6.

The blocking levers 104, 105 and 106 are individually urged to rock in a clockwise direction about the pivot shaft 107 by contractile springs 110 individual to them and each of the blocking levers 104, 105 and 106 has a cam engaging portion 111 (hidden behind lever 121 in FIG. 1) which extends into engagement with the surface of cams 112, 113 and 114, respectively, on a cam sleeve 115.

The cam sleeve 115 is rotatable about a stud shaft 116 and has a locating or retaining cam 117 formed on it as well as a manually operable knurled wheel 118. The wheel 118 as may be seen more clearly in FIG. 5 extends partially through a slot 119 formed in the tape lid plate 62. The knurled wheel 118 has four flats 120 formed on it on which there are engraved the numerals 5, 6, 7 and 8. These flats are disposed with respect to the cams 112, 113 and 114 in such a manner that when the numeral 8 is exposed through the slot 119 the cam sleeve 115 will be in the position shown in FIGS. 1 and 5 in which position it will be held by a retaining lever 121 which has a flat surface that engages one of the flat sides of the locating or retaining cam 117 and is urged into engagement with that surface by a spring 122.

The cam 112, 113 and 114 are so arranged on the cam sleeve 115 that when the numeral 8 is exposed through the slot 119 none of the blocking levers 104, 105 or 106 will be rocked from the position shown in FIG. 1 to a position where they would block the upward movement, toward the tape, of the sensing pins 35–6, 35–7 and 35–8. This will be the position of the cams when the wide type of tape is being fed through the apparatus, that is, a tape having an eight level code. Therefore, the tape guide members 67, 68, 69 and 70 will be adjusted or set to the position shown in FIG. 4.

When the kurled wheel 118 is rotated to position to expose the numeral 5 through the slot 119, the cams 112, 113 and 114 will all have their high points in association with their respective levers 104, 105 and 106 and consequently, the blocking levers 104, 105 and 106 will at this time be rocked counterclockwise from the position shown in FIG. 1 to engage their arms 108 with the shoulder 109 of their respective sensing pins 35 to handle a five level tape. When a five level tape is being read by the tape reader the tape guide members 67 to 70 will be moved inwardly to position where the rounded projection 82 will be nested in the innermost rounded notches 83 of the tape lid plate 62.

When six or seven level tapes are being read in the apparatus the tape guide members 67 and 69 will be maintained in the position shown in FIG. 4, whereas the tape guide members 68 and 70 will be moved to their intermediate position where the rounded projections 82 will nest in the center one of the notches 83 associated with these tape guide members 68 and 70. In order to prevent the sensing pins 35 from either registering the absence of perforations in the tape or from nibbling off the edges when the six or seven level tapes are being read, the knurled wheel 118 is rotated to present either the numeral 6 or the numeral 7 in view through the slot 119. When the six level tape is being read by the tape reader the blocking levers 105 and 106 associated with the sensing pins 35–7 and 35–8 will be rocked to their blocking position by the cams 113 and 114.

Although only one embodiment of the invention is shown in the drawings and described in the foregoing specification it will be understood that invention is not limited to the specific embodiment described but is capable of modification and rearrangement and substitution of parts and elements without departing from the spirit of the invention.

What is claimed is:

1. A tape reader for reading tapes having different numbers of significant levels comprising:

a plurality of contact controlling tape sensing pins, one of each level of a tape, means for feeding tape step-by-step past said pins;

resilient means individual to said tape sensing pins for urging all of them toward said tape to detect the presence or absence of code perforations in each level of the tape;

cam actuated means common to said sensing pins for positively retracting all of said sensing pins away from said tape and for releasing all of said sensing pins for movement toward said tape by said resilient means;

means settable to block movement toward the tape of the sensing pins associated with selected levels in the tape after said pins are released by said cam actuated means thereby preventing movement of said sensing pins associated with said selected levels by said resilient means when a tape is being read which has less than the maximum number of levels, and actuator means selectively operated to set said last-mentioned means in blocking position.

2. Apparatus according to claim 1 where the means settable to block movement of the sensing pins prevents their actuation by their respective resilient means and the actuator means for selectively operating the means to block movement of the sensing pins is a cam means having a common actuator.

3. Apparatus according to claim 1 wherein there is provided a tape guiding means mounted at opposite sides of said tape feeding means and settable toward or away from said feeding means to guide tapes of various widths past the sensing pins and said tape feeding means includes a plate having guide locking notches in it, each of the tape guiding means comprising a block having a tape guiding edge, a guide projection for holding it normal to the path of the tape being fed, a rounded projection for locating it with respect to the tape being fed and resilient means on the guide projection for holding the block in selected set position with said rounded projections nested in said notches.

4. The apparatus according to claim 1 wherein the means to block movement of the sensing pins is a plurality of blocking levers aligned with predetermined ones of the sensing pins which are normally held out of the path of movement of the sensing pins toward the tape and the actuator means includes a plurality of cams individual to the blocking levers and rotatable by a common actuator to move said blocking levers into the paths of the sensing pins.

5. Apparatus according to claim 4 wherein said common actuator is a shaft having a manually operated thumb wheel fixed to it to shift the cams for moving at least one blocking lever into the path of its associated sensing pin upon movement of the thumb wheel out of its normally inactive position.

6. A tape reader for reading tapes of different widths and having different numbers of significant levels comprising:

a contact controlling tape sensing pin for each tape level;

means for feeding tape step-by-step past said pins;

a plate over which the tape is fed to the sensing pins and having a plurality of guide locking notches formed on its surface;

tape guide means mounted at opposite sides of said tape feeding means and settable toward or away from said feed means to guide tapes of narrower or wider widths over said plate to the sensing pins;

each of said guide means having a tape guiding surface for engagement with an edge of the tape and a projection for selective registration in one of said notches to hold the guide meansin guiding position; and means for resiliently holding said projection in a selected notch.

References Cited by the Examiner

UNITED STATES PATENTS

| | | | |
|---|---|---|---|
| 1,926,203 | 9/1933 | Lasker | 235—61.112 |
| 2,377,978 | 6/1945 | Steeneck | 226—199 |
| 2,429,730 | 10/1947 | Pitman | 235—61.113 |
| 2,783,944 | 3/1957 | Jones | 235—61.112 |

MAYNARD R. WILBUR, *Primary Examiner.*

DARYL W. COOK, MALCOLM A. MORRISON, *Examiners.*

R. COUNCIL, M. A. LERNER, *Assistant Examiners.*